United States Patent
McIntosh et al.

(10) Patent No.: US 9,234,960 B1
(45) Date of Patent: Jan. 12, 2016

(54) SYSTEMS FOR DETERMINING VEHICLE LOCATION

(71) Applicants: P. Stuckey McIntosh, Atlanta, GA (US); C. Hunter Tison, Atlanta, GA (US)

(72) Inventors: P. Stuckey McIntosh, Atlanta, GA (US); C. Hunter Tison, Atlanta, GA (US)

( * ) Notice: Subject to any disclaimer, the term of this patent is extended or adjusted under 35 U.S.C. 154(b) by 145 days.

(21) Appl. No.: 14/211,173

(22) Filed: Mar. 14, 2014

Related U.S. Application Data

(60) Provisional application No. 61/798,879, filed on Mar. 15, 2013.

(51) Int. Cl.
- *G01S 15/18* (2006.01)
- *E01F 9/047* (2006.01)
- *G01S 5/18* (2006.01)

(52) U.S. Cl.
CPC .. *G01S 5/18* (2013.01); *E01F 9/047* (2013.01)

(58) Field of Classification Search
CPC ........... G01S 5/18; E01F 9/047; G08G 1/052; G08G 1/02; G08G 1/04; B60T 2201/08; B60W 40/068

See application file for complete search history.

(56) References Cited

U.S. PATENT DOCUMENTS

| | | | | |
|---|---|---|---|---|
| 3,044,043 A | * | 7/1962 | Wendt | E01F 9/005 246/122 R |
| 6,014,595 A | * | 1/2000 | Kobayashi | E01F 9/047 340/438 |
| 6,259,374 B1 | * | 7/2001 | Kisner | G08G 1/0962 340/435 |
| 6,333,701 B1 | * | 12/2001 | Mee | G08G 1/07 340/683 |
| 7,477,978 B2 | * | 1/2009 | Kawazoe | B62D 6/00 701/1 |
| 8,427,341 B2 | * | 4/2013 | Yulevich | G08G 1/096783 340/901 |
| 2006/0224293 A1 | * | 10/2006 | Kawazoe | B62D 6/00 701/70 |
| 2014/0241126 A1 | * | 8/2014 | Funayama | G01S 3/808 367/129 |

* cited by examiner

*Primary Examiner* — Daniel Pihulic

(57) ABSTRACT

Systems, methods and apparatuses for determining the location, direction of travel and other parameters of wheeled vehicles such as cars and trucks being driven along public roads and highways based on sounds produced, transducers and digital signal processing.

4 Claims, 11 Drawing Sheets

SYSTEMS FOR DETERMINING VEHICLE LOCATION

RELATED APPLICATIONS

This non-provisional patent application claims priority benefit, with regard to all common subject matter, of earlier-filed U.S. Provisional Patent Application No. 61/798,879, filed Mar. 15, 2013, and entitled "SYSTEMS FOR DETERMINING VEHICLE LOCATION." The identified earlier-filed provisional patent application is hereby incorporated by reference in its entirety into the present non-provisional application.

INTRODUCTION

This patent application pertains to systems, methods and apparatuses to determine the location, direction of travel and other parameters of wheeled vehicles, principally but not limited to cars and trucks, that are or were in motion along public or private roads, parking lots, highways and highway entrance and exit ramps.

Alternative methods of vehicle-detection systems include magnetic-sensor loops installed in slots that are sawed into roadways, cameras in communication with computers running vehicle- and motion-sensing software, rubber hoses stretched across roadways and other methods. Systems are under consideration that will utilize the wirelessly uplinked GPS coordinates of so-called smart cars from one to another, and from vehicles to the intelligent infrastructure, but such systems are of no benefit to the many legacy vehicles on the road.

An object of this invention is to determine the location, speed and direction of travel of one or a plurality of vehicles and to determine when the occupants of those vehicles may be in imminent danger due to such causes as: the vehicle they occupy has entered an exit ramp of a divided highway going the wrong way, and will soon face oncoming traffic; the vehicle they occupy is approaching a traffic light or stop sign and is on a collision course with another vehicle unless one or both vehicles slows or stops; the vehicle they occupy is approaching a sharp curve at a speed that is too fast for the curve, or too fast for the curve under present road conditions such as rain, snow or ice; other circumstances as may warrant an alert to the driver.

BACKGROUND OF THE INVENTION

Traditional, so-called rumble strips have been in use for many years. These are often placed in three or four groups of raised, parallel bars across one lane of traffic, perpendicular to the direction of travel in advance of stop signs or traffic lights as an alert to drivers. The tires of a vehicle passing over a rumble strip make a staccato buzz-saw-like sound, alerting a driver to an upcoming stop sign or traffic light, as in FIG. 2. In like manner, narrow rumble strips incorporated into the shoulder of a paved road will alert a dozing driver who may have inadvertently drifted onto a road's shoulder, as in FIG. 3, before the vehicle leaves the road entirely.

Musical rumble strips have been placed as a novelty or entertainment on roadways. In this usage, the spacing between bars is varied, so that when a vehicle travels over the strips at a steady speed, a few bars of a recognizable tune are reproduced, such as a college fight song, a national anthem or a current pop tune.

More recently, some automakers have incorporated rumble-strip detection systems into certain models of their automobiles, or have discussed doing so. One such system detects road-shoulder rumble strip will activate an electromechanical steering mechanism to automatically steer a car away from the shoulder and back onto the road. In a similar manner, passing over lane-width rumble strips as in FIG. 2 could activate an automatic braking system if, according to the system's calculations, the vehicle's driver and was not applying braking in a degree sufficient to manage a timely full stop at an upcoming stop sign, railroad crossing, intersection or other potential hazard.

All of these prior-art systems utilize analog techniques, similar to the 45- and 33-1/3-RPM/LP vinyl records of an earlier era. Pitch may be altered by adjusting the spacing between the individual rumble bars or vehicle speed. A vehicle-on-board system that has a speed sensor input can compensate for speed and calculate a bar spacing value. Different bar spacings may signal different events, such as leaving the left side of a road, leaving the right side of a road, or approaching a stop sign or traffic light. The number of different events that can be encoded in such a manner is quite limited.

An object of the present invention is to greatly expand the capabilities and function of rumble strips by incorporating digital techniques into their design. Another object of the present invention is to advance detection means, methods and apparatuses, achieving ends that are not achievable using conventional analog rumble strips.

Yet another object of the present invention is to detect and process the noise generated by one or more wheeled vehicles traveling over a road or other navigable surface wherein the surface has not been prepared or modified in any way, and to measure and distinguish certain parameters of each of those one or more vehicles individually by means of cross correlation between vehicle-generated noise received at multiple non-collocated transducers and applying digital signal processing techniques to perform any or all of time and pitch shifting, environmental-factors correction, amplitude adjustments and other adjustments to the multiple inputs from multiple sound and vibration transducers. The certain parameters include but are not limited to vehicle location, speed, direction, acceleration, deceleration and collisions between vehicles, or collisions between vehicles and fixed obstacles or terrain features.

DESCRIPTION

Figure 8:
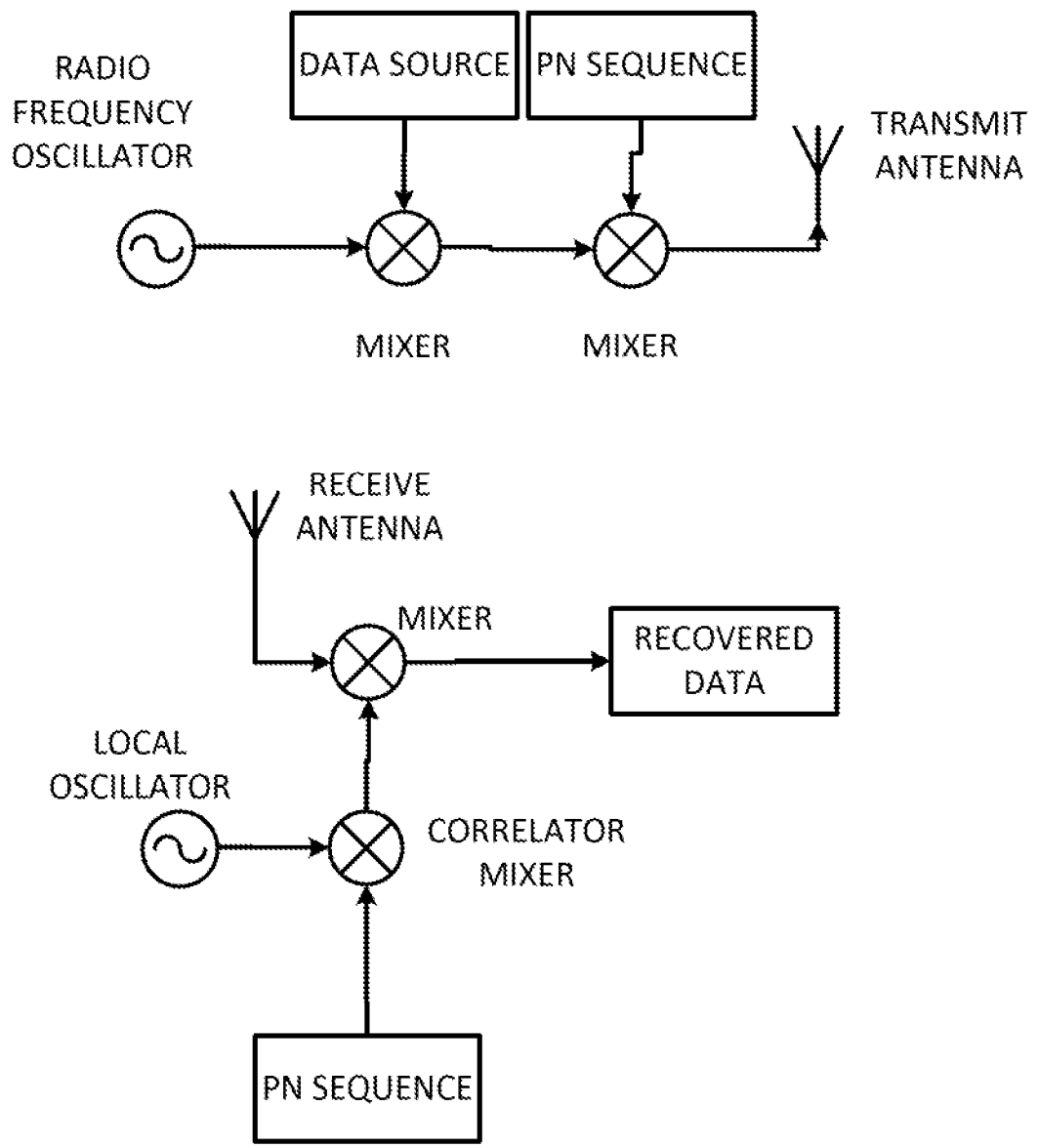
FIG. 8 is a schematic view of a circuit for transmitting and receiving sensor data in accordance with the present disclosure.

Direct sequence spread spectrum (DSSS) as a method for successful digital radio communication in the presence of overwhelming noise, that is, when signal-to-noise ratio is low or negative is well known in the field of radio communication, particularly among defense contractors. Using DSSS, binary data at one bit rate is multiplied by or mixed with using a faster, usually pseudorandom or pseudonoise (PN) bit stream, which is used to modulate a radio-frequency carrier. These pseudonoise bits are typically called chips, to distinguish them from data bits, and the bit rate of the spreading sequence is called the chip rate. Application of this faster-rate sequence results in a wider bandwidth signal, and thus the name spread spectrum. Band-limited true random noise can be used for spreading, but this is not conventionally done. At the receiving end of a DSSS system, a receiver system generates that same pseudonoise bit stream, or a recording of true noise if true noise is employed, multiplying or mixing the received signal with it to remove the spreading code, thus revealing the underlying data. The part of the receiver system that performs this removal is called a correlator. A simplified, representative DSSS communications system is shown in FIG. 8. Using a correlator, a radio transmitter that is transmitting the correct or matching PN sequence can be detected by a matching receiver even in the presence of overwhelming noise, whether or not the transmitter is transmitting data.

Figure 4:
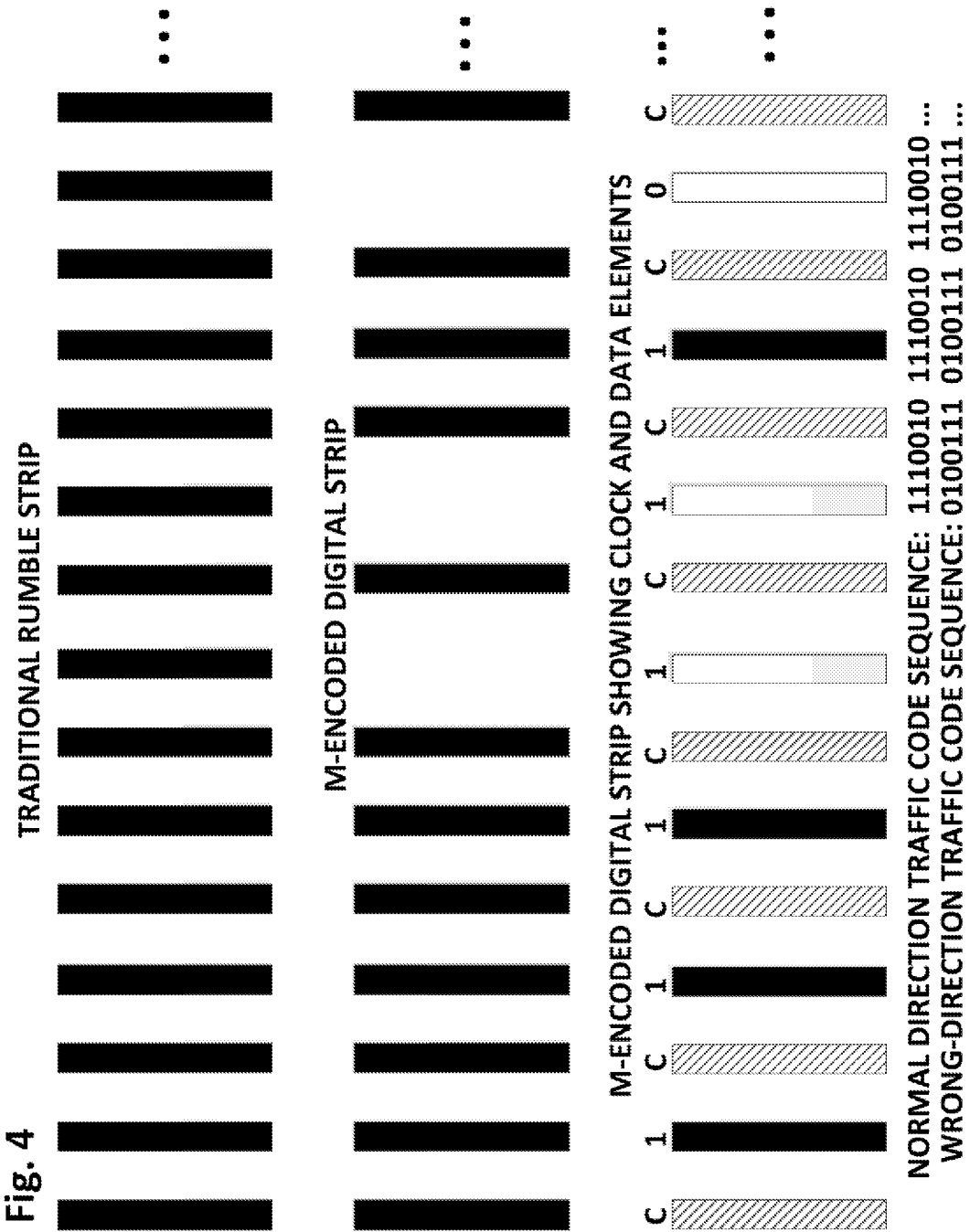
FIG. 4 is schematic view of the layout of exemplary rumble strips for use on a navigable roadway.
Figure 9:
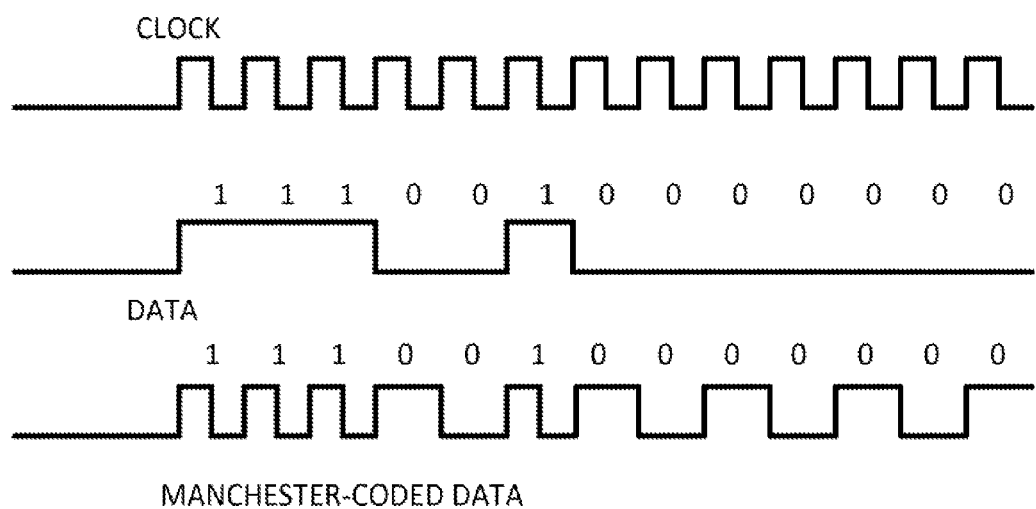
FIG. 9 is a schematic view of a CLOCK signal and road DATA signal combined in a CDMA code from which the CLOCK signal and DATA may be extracted.

An acoustic or vibrational analog of a direct sequence spread spectrum signal in or near the range of human hearing of 20 to 20,000 Hz can be generated by the tire of a vehicle rolling over a properly designed, prepared road surface, such as rumble strips arranged in a non-periodic or quasi-periodic manner along the direction of travel, as shown in FIG. 4. Direct-sequence spread spectrum (DSSS) codes and other digital codes can be encoded into these strips by adjusting the spacing of bars making up a conventional rumble strip, or by removing certain strips and leaving others in place. In radio communications, DSSS codes can be optimized in various ways. For example, in a communications system having a single receiver and two transmitters, two DSSS codes might be designed, one for each transmitter, with low cross correlation between the two codes, that is, of one code against the other, in order to minimize cross interference between the two transmitters, both which may transmit simultaneously on the same frequency. This is CDMA, code-division multiple access. Codes for roads can be designed so that the chip-sequence clock signal can be easily extracted, as is the case with the Manchester-like encoded strips illustrated in FIG. 4. Manchester code corresponding to the binary sequence 1110010 and clock is illustrated in FIG. 9.

A spread-spectrum code can be designed to have minimum correlation with its binary inverse, a property for which the shift-register-and exclusive-OR-gate-generated maximal-length pseudo-noise sequences are well known. For maximum discrimination between correct-direction traffic and wrong-direction traffic, codes could be designed so that the normal or forward code has minimal correlation with the same code in reverse order, for instance 110010 as compared to 010011.

Figure 11:
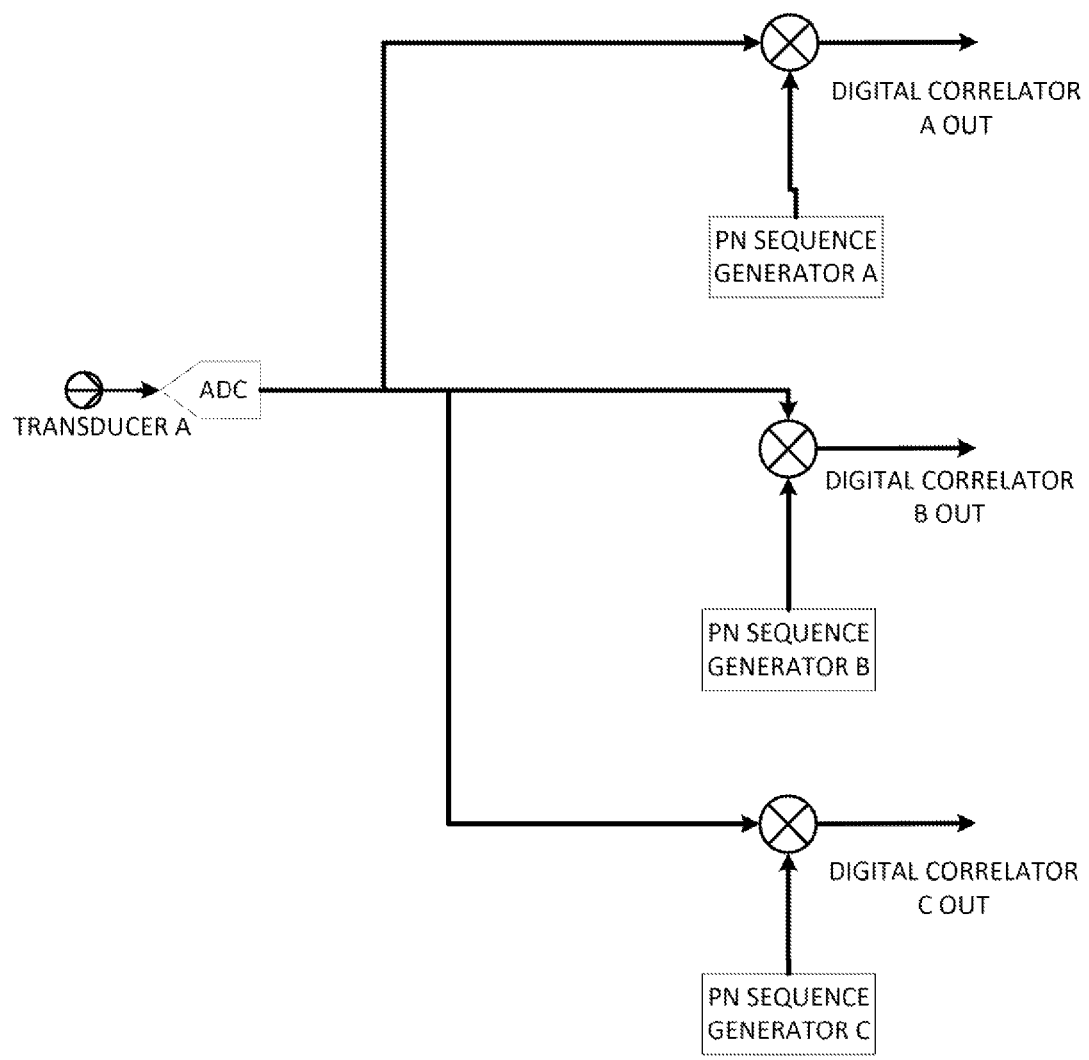
FIG. 11 is a schematic view of a circuit for processing sensor signals in accordance with the present disclosure.

By relatively straightforward comparison or cross correlation of the electrical output produced by a sound or vibration transducer such as a microphone when a car or other wheeled vehicle drives over a binary-encoded rumble strip as shown in FIG. 4 with a binary representation of that same code stored in local memory, vehicle speed, which is proportional to chip rate, and correct or incorrect direction of travel, which is determined by noting whether the forward or reverse binary spreading code is received, are readily discerned. The predefined binary sequence is encoded into the road surface by means of unequally spaced rumble strips. That binary sequence, forward or backward, is replayed when the tire of a vehicle rolls over the encoded surface, and a pair of correlators, one for the forward sequence, one for the reverse, trigger logic depending on which has an output signal above a certain predefined threshold. A simplified version of such a system is illustrated in FIG. 11.

Figure 10:
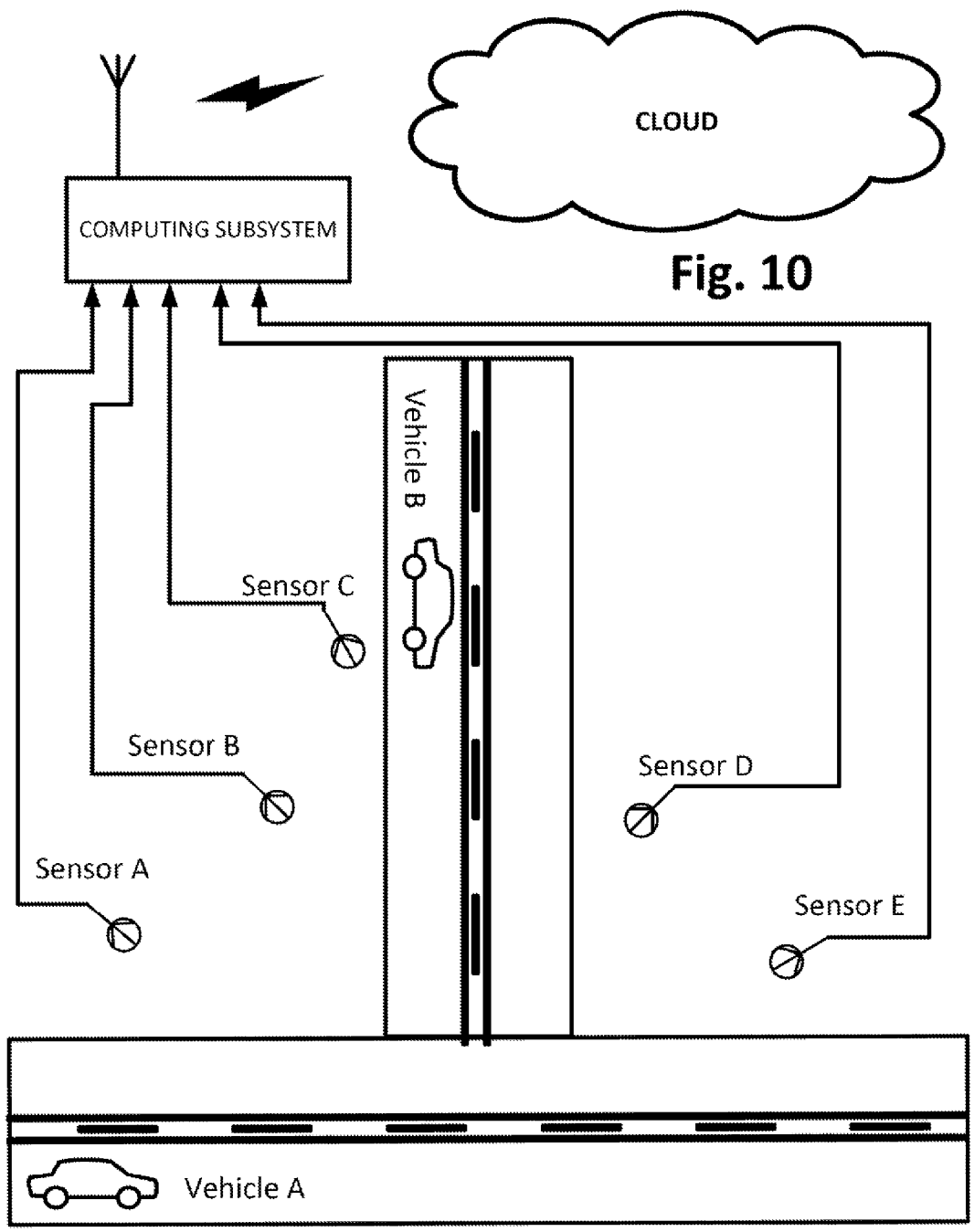
FIG. 10 is a schematic view of an exemplary system of the present disclosure.

Such a system could serve multiple purposes. Using transducers and a receiver system located either in a vehicle or beside a roadway, the system could alert a driver, law-enforcement or public-safety personnel when he has inadvertently entered the exit ramp of a divided highway. Such a system is shown in FIG. 10.

The sound of a wheeled vehicle rolling along a normal, unencoded road surface is generally a mixture of random noise such as wind noise, independent uncorrelated noise coming from each of the tires rolling along the surface, discrete frequencies that may emanate from the tires due to tread pattern or road-surface features, engine noise and exhaust noise. Except for these discrete frequencies, the noise is truly random in nature, and true random noise will not correlate well with any pseudo-noise sequence. However, once random noise begins to propagate through a medium such as air, the phases and frequencies (spectral characteristics) of the propagating noise are preserved in the medium, though amplitude fades with distance.

Figure 1:
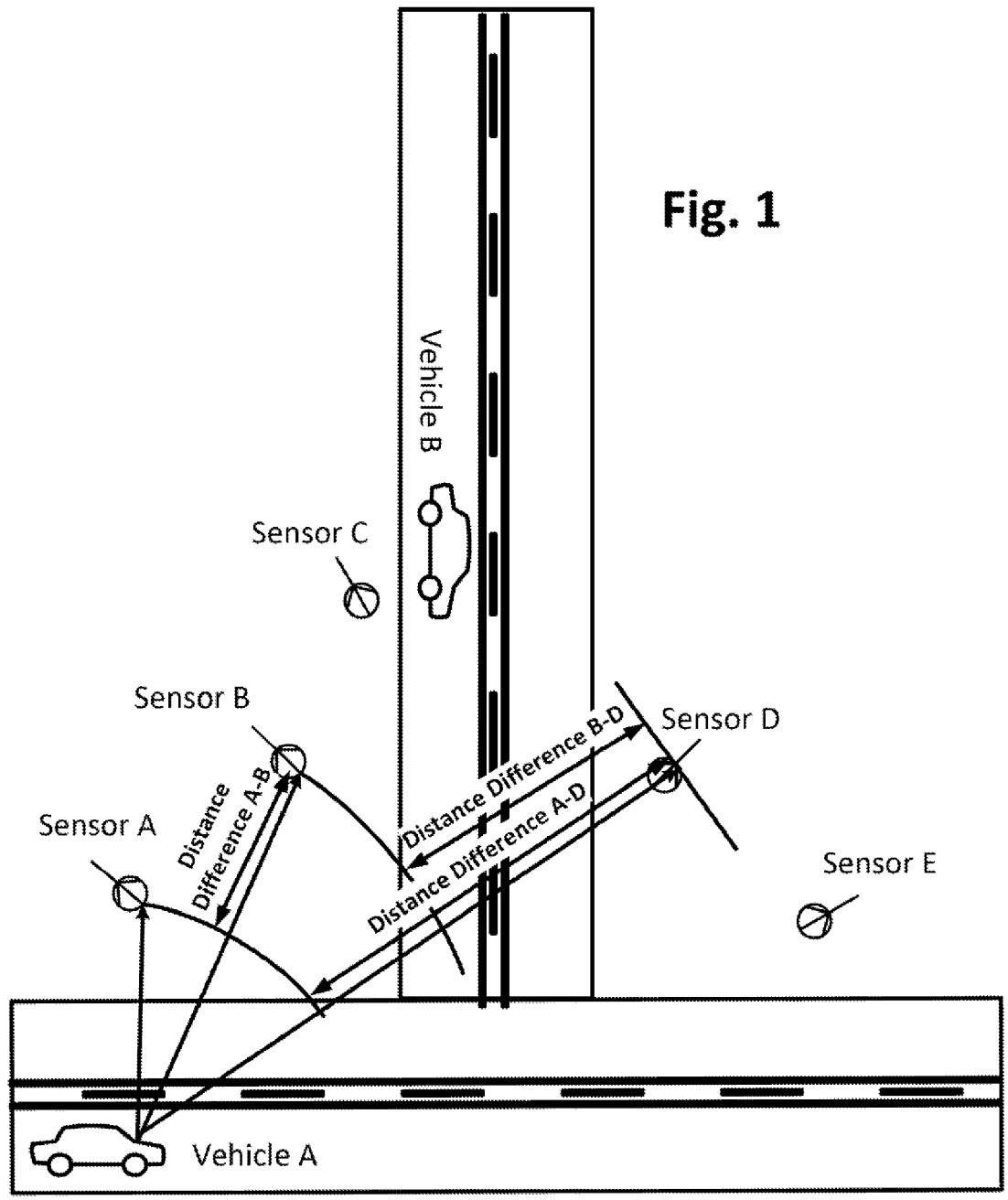
FIG. 1 is a schematic view of a navigable roadway for land vehicles in accordance with the system of the present disclosure.
Figure 2:
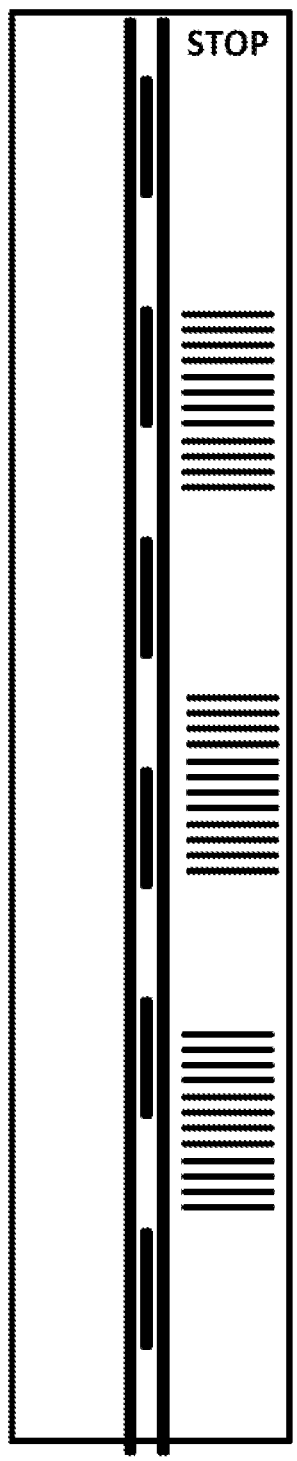
FIG. 2 is a top elevation view of a navigable roadway in accordance with the system of the present disclosure.
Figure 3:
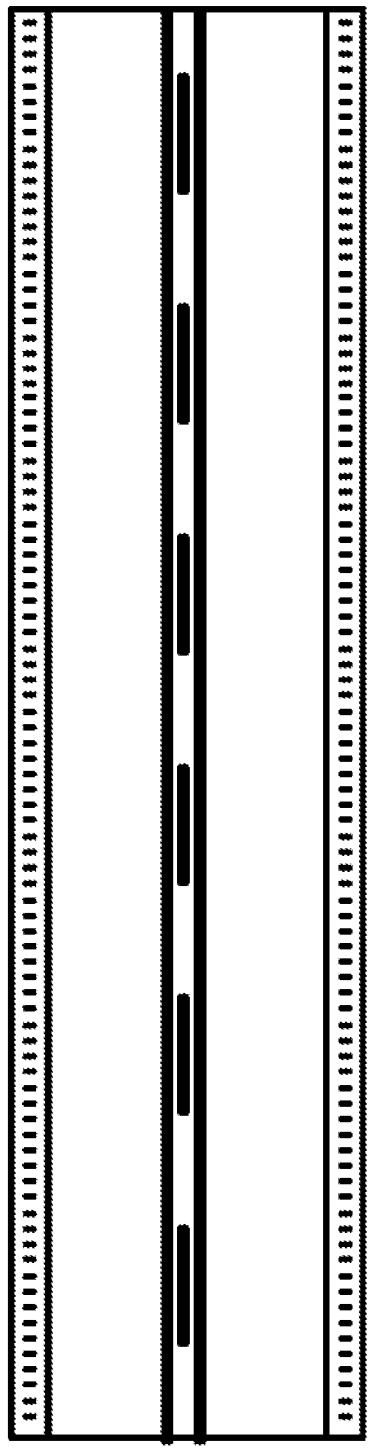
FIG. 3 is a top elevation view of another navigable roadway in accordance with the system of the present disclosure.

Because of this preservation of spectral characteristics in the medium, the random noise generated by a rolling vehicle, when converted to electrical form by a first sound or vibration transducer such as a microphone as shown in FIG. 1, can be correlated with the electrical representation of that same noise received and converted to electrical form by a second non-collocated sound or vibration transducer such as a second microphone, by means of adjusting time delays, gain controls, sample rates and other parameters for each of the two signals separately until a maximum correlation between the two signals is achieved. This corresponds to a cross-correlation peak between the two signals. The time-delay difference used to achieve peak correlation will be equal to the time-difference-of-arrival of the received sound (noise) at each of the two transducers. Provided that the positions of the first and second transducers are known in three-dimensions and the speed of sound in air is known, a partial fix on the location of the noise source—typically a moving vehicle—can be obtained. This partial fix will consist of a pair of hyperbolic curves with the two transducers as foci. Of the pair of curves, the curve furthest from the transducer or focus at which the sound arrived first can be eliminated, leaving only one curve. The vehicle will be located at a point along one of the hyperbolic curves shown in FIG. 7. By employing other information, such as that the vehicle is confined to the physical limits of the known road surface, and additional fix information computed by employing a third transducer that is not collocated with either the first transducer or the second transducer, the unambiguous vehicle position is readily determined from the intersection of the hyperbolic curves, that is, by obtaining a simultaneous solution to two relatively simple, independent hyperbolic equations. Additional accuracy and range can be obtained by the placement of additional non-collocated transducers, with no practical maximum number of transducers.

Figure 5:
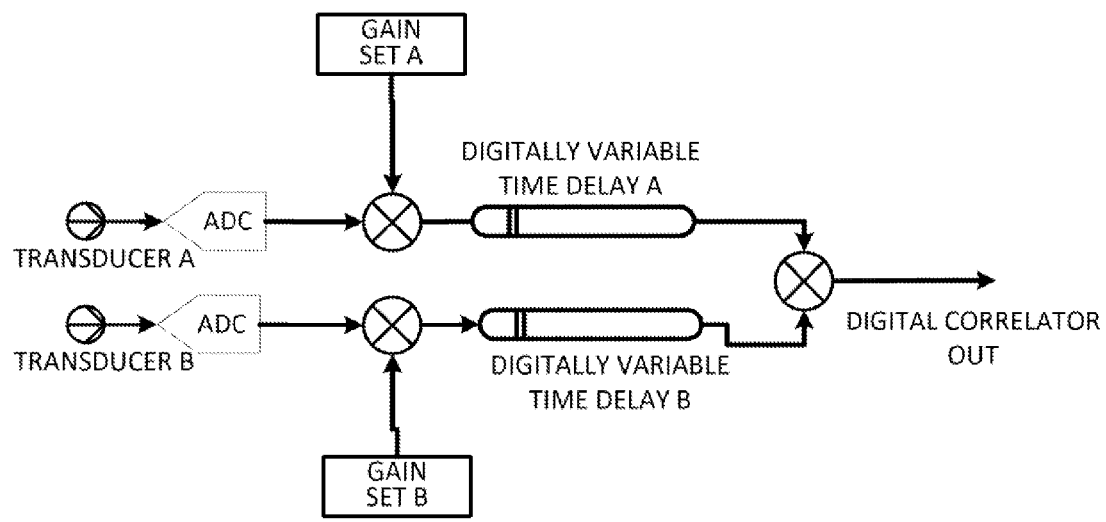
FIG. 5 is a schematic view of a circuit for processing sensor signals in accordance with the present disclosure.
Figure 6:
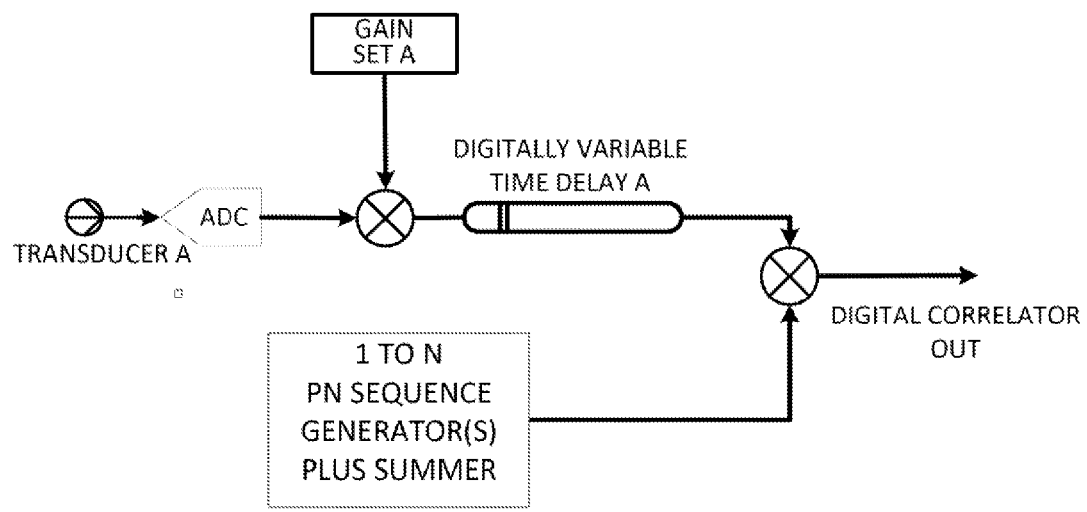
FIG. 6 is another schematic view of a circuit for processing sensor signals in accordance with the present disclosure.
Figure 7:
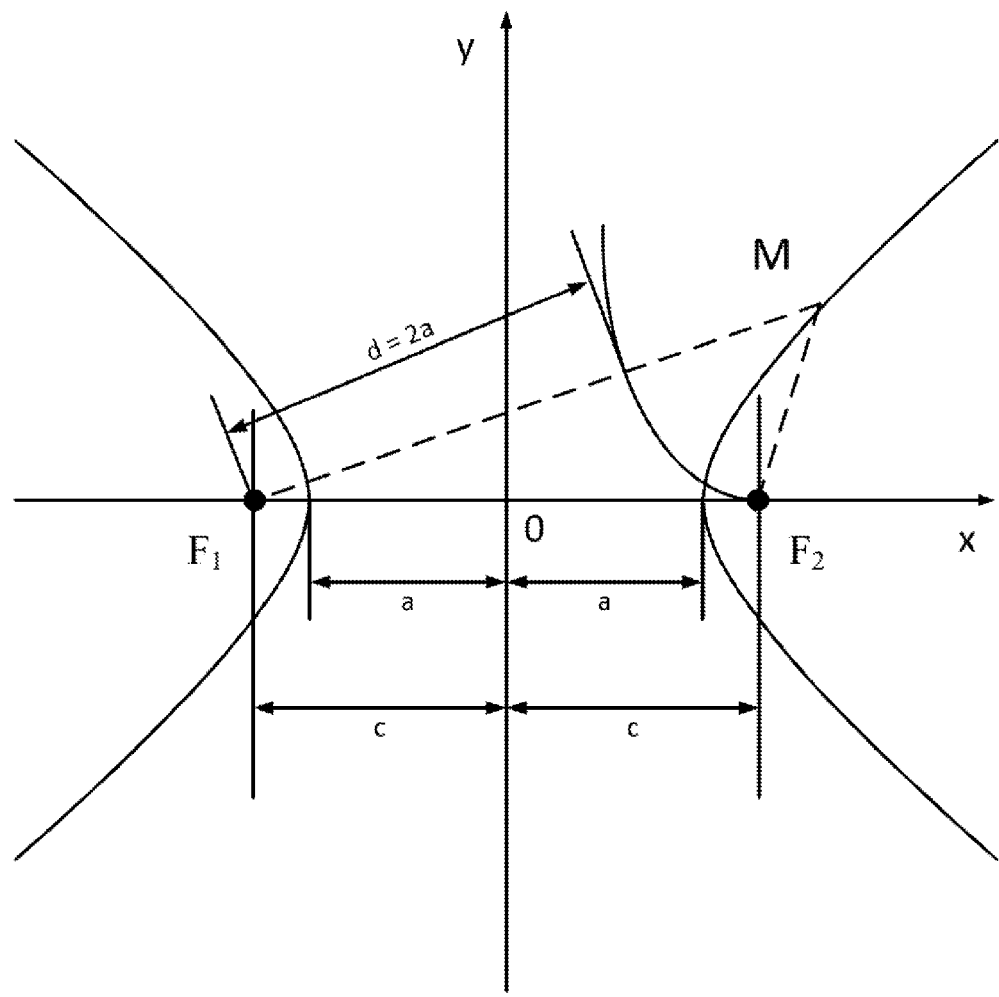
FIG. 7 is a schematic view of a sensor arrangement for use in calculating the position of a vehicle.

The position of a vehicle is solved as shown in FIG. 7. Transducers are located at foci F1 and F2, which lie along the x axis at points (C, 0) and (–C, 0). In this example, the vehicle is at point M along one of the hyperbolic curves. The noise from the vehicle arrives at the transducers at different times. A search is performed for maximum cross correlation between the signal arriving at a transducer located at F1 and the signal arriving at a second transducer located at F2 by adjusting the digital time delay between the signal from F1 (the first arriving) and adjusting the gain of the signal arriving at F1 (the more distant transducer), using a signal processing subsystem as is illustrated in FIG. 5. When maximum correlation is obtained, the time difference of arrival is read directly, and the transducer at which the signal arrived first is noted (the transducer to which is applied the greatest time delay at peak correlation). This time difference is converted to a distance difference by multiplying the time difference by the speed of sound in air, which is approximately 774 mph at 25 degrees Celsius. This distance value is equal to 2a in the hyperbolic curve equation below:

$$\frac{x^2}{a^2} - \frac{y^2}{(c^2 - a^2)} = 1$$

shows that the vehicle is along one of the two curves plotted in FIG. 7. Since the sound arrived first at location F2, the left-most curve can be eliminated, so we know that the vehicle is along the right-most curve. Using time-difference-of-arrival at a third transducer (not shown), another pair of hyperbolic curves can be drawn, and one of that pair can be eliminated using the rule that the correct curve is nearest the transducer at which the sound of the vehicle arrived first. The point at which these hyperbolic curves cross is the unambiguous location of the vehicle.

Using inputs from three transducers, three time-difference values can be derived, and thus three sets of hyperbolic curves can be obtained, six curves in all, and one from each pair can be eliminated, leaving three curves. All of these three will have a common point of intersection, and that will represent the location of the vehicle, or more accurately, the location of the vehicle at the time that the noise made by that vehicle arrived at the transducers, which will be different for each transducer since the distances are not equal. Correct location can be calculated by correcting for this non-zero sound travel time. The number of independent time-difference values that can be derived from n independent, non-collocated transducers is given by $_nC_2$, n-combination-2 (assuming n>2) which is calculated by $$\frac{n!}{2!(n-2)!}$$

Thus for 3 transducers or $_3C_2$, $$\frac{3 \times 2 \times 1}{2 \times 1 \times (1)} = \frac{6}{2} = 3$$

three time differences can be calculated.

For five transducers or $_5C_2$, $$\frac{5 \times 4 \times 3 \times 2 \times 1}{2 \times 1(5-2)!} = \frac{120}{2 \times 3!} = \frac{120}{2 \times 3 \times 2 \times 1} = \frac{120}{12} = 10$$

ten time differences can be calculated.

Once a position fix is obtained or acquired in this manner, current position can be tracked based on predictive algorithms, closed-loop feedback and simple second-order control loops wherein correlation is maximized. Given the non-zero propagation time of sound in air, further corrections to actual position may be made, based on calculated position, the known speed of sound, the distance from the vehicle to each transducer and the speed and the direction of the vehicle relative to each transducer. Further precision can be obtained by correcting for Doppler shift at each transducer by means of up-sampling or down-sampling in the time domain, or by means of numeric operations performed on the frequency-domain representation of a signal after applying any of the Discrete Cosine Transform (DCT), the Fast Fourier Transform (FFT), the Discrete Fourier Transform (DFT) or another mathematical operation that transforms a sampled time-domain representation into a frequency-domain representation. Additional corrections for local air temperature and relative humidity, both of which affect the speed of sound in air, can be applied to improve system accuracy. Wind speed and gusts can be measured using an ultrasonic anemometer or similar instrument, and individual corrections can be applied to the signal from each individual transducer.

A known digital map of roadway surfaces, a known digital map of obstacles and of the transducer locations can be stored in a database accessible by a computer subsystem. The system is calculating the positions of vehicles on a running basis. With this information, the system can generate a real-time moving-map display showing the local road surfaces, obstacles, transducer locations, and icons representing all vehicles moving in real time across the road surfaces, with changing colors and audible alerts representing such things as speeding vehicles, erratically driven vehicles, predicted collisions between vehicles, predicted collisions of vehicles with terrain features, buildings, signs, vegetation and other obstacles. The system can predict vehicle departures from the known roadway surface based on speed that is excessive for known curves in the roadway, or speed that is too fast for known or forecast weather conditions such as rain, snow or ice.

Though uncalibrated accuracy should suffice, each system installation could be individually calibrated in order to attain maximum accuracy and shortest vehicle acquisition time. The invention may be easily calibrated by a number of means, one of which is described here. Equip a test vehicle with WAAS-equipped GPS together with a wireless transceiver that uploads current test-vehicle position to a wireless transceiver within the fixed DSP element. A true random number generator (TRNG) within the test vehicle generates random audio noise, which is played through a loudspeaker on exterior of the test vehicle. As the test vehicle is driven along the roads or other navigable surfaces as may be within listening range of the system, the system is determining calculated position based on the simultaneous solution of multiple hyperbolic equations, an internal 3D map of the surrounding navigable surfaces, correction factors such as Doppler, temperature, humidity and local wind velocity. At the same time, the system's DSP is receiving the precise transmitted coordinates of the test vehicle as determined by the onboard GPS. An independent GPS located at the fixed site of the DSP provides high-accuracy corrections by applying a differential value obtained by subtracting its reported GPS position from its known and internally stored geographic location. In this way, a superbly accurate test-vehicle location is obtained that can be compared to the local, hyperbolic-curve-derived, calculated position. By driving the test vehicle along all available local routes and building a table of error values in a database, maximum accuracy can be attained.

Transducers, such as microphones and vibration sensors, need not be wired directly to the digital signal processing element, but may instead be connected to it by digital wireless communications technologies. If packetization is employed and results in significant latency, that transmission latency can be compensated for by subtracting known latency from total relative time delay measurements within the DSP.

It is not essential that all signal processing be done centrally. A distributed processing scheme, wherein certain steps are performed prior to transmission to a central site for correlation and final calculations would function just as well.

The tracking algorithms that maintain a maximum correlation value by adjusting the time delays and amplitudes of the various input channels may function in a sequential mode, wherein a dedicated acquisition algorithm runs prior to switching to a separate tracking algorithm, or tracking may proceed immediately from acquisition once an acceptable peak correlation value is attained, that is, a peak correlation value that exceeds a certain predetermined threshold.

The physical placement of sensors or transducers with respect to the roads or navigable surfaces to be overseen by the system may be a fixed arrangement of transducers that varies little from one site to the next. Alternatively, it may be that the terrain or the arrangement of roads leads to a calculated optimal placement of transducers that provides the greatest range, the greatest accuracy or superiority in some other respect, given the particular terrain and navigable-surface placement at each given location.

The DSP algorithms can simultaneously acquire and track multiple vehicles. Once vehicles are being tracked, their current and projected positions, based on speed, acceleration, current trajectory and projected trajectory can be analyzed individually and with respect to each other, so that collisions, departures from the paved surface and other undesirable outcomes can be foreseen. Based on these predictions, actions may be taken which are in proportion to the severity of a predicted event.

For example, if a vehicle is approaching a stop sign at a high rate of speed and appears unprepared to stop, and there are no other vehicles on an intersecting road, the computing subsystem might activate a warning light or sound directed at the offending driver of that one vehicle. If on the other hand, a vehicle is approaching a stop sign at a high rate of speed, appears unprepared to stop, and there is one or more vehicles that are on a predicted collision course with that vehicle, the computer subsystem system may activate other, more prominent warning lights or sounds directed at all drivers and the intersection in general, in the hope that the predicted collision will be averted.

That a collision has been averted will be evident to algorithms within the computer subsystem, indicated by all vehicles proceeding on their various ways. That a collision has occurred will be indicated by sharp, sudden changes in or cessation of vehicle movement and by the sound of impact, which the computer subsystem can distinguish from general background noise.

It is envisioned that the computer subsystem will not be a stand-alone system, but will be networked with the cloud and other servers and subsystems connected thereto. The computer subsystem is capable of functioning independently if network connections are unavailable. In general, the computer subsystem will be part of a larger network of identical or similar computer subsystems, which also may be linked to nearby police and other public-safety agencies, who may respond to detected events in ways they deem appropriate.

The invention claimed is:

1. A system comprising:
   a linear or grid arrangement of any combination of raised, cut or etched circular, triangular, square, rectangular or other-shaped elements bonded to or formed from a navigable surface, such as a roadway, a parking lot, a highway entrance ramp or exit ramp that is navigable by wheeled vehicles, capable of generating sound or vibrations when the tire of at least one automobile, truck, cycle or other wheeled vehicle rolls over them, wherein the relative spacing between one element and those elements immediately adjacent to it as well as the dimensions and shape of each individual element are optimized or set such that when a tire or wheel of the at least one vehicle rolls over them, a sound pattern or vibration sequence corresponding to one or more binary sequences or digital codes results;
   at least one transducer such as a microphone, accelerometer or other vibration- or motion-sensing element or transducer located in one or any combination of under or inside the navigable surface, adjacent to or above the navigable surface or incorporated into or attached to the at least one wheeled vehicle moving over the navigable surface so that transducer will respond to the sound pattern or vibration sequence, converting the sound sequence or vibration pattern into at least one proportional analog or binary digital electrical signal;
   and at least one digital processor or other arrangement of digital logic or analog circuitry in combination with stored binary codes corresponding to said element patterns, shapes dimensions and relative spacings such that high correlation values are obtained when the signal from the at least one transducer is compared with the stored binary sequence so that information corresponding to any of vehicle speed, direction of travel, vehicle weight, tire traction, acceleration in any direction including negative acceleration or braking, tire condition, tire size and width and other parameters may be derived by analyzing the correlation peaks, the bit rates corresponding to correlation peaks, and the relative amplitudes of the correlation peaks.

2. A computing subsystem, such as a digital signal processor with program memory and operating memory, capable of communicating with a plurality of fixed transducers, such as microphones, accelerometers or other sound, vibration- or motion-sensing elements, said transducers having known locations and either directly producing digital representations as outputs or analog representations that may be subsequently converted to digital outputs using analog-to-digital converters, said computing subsystem running at least one program capable of computing any of the position, speed or direction of travel of any of:
   i. at least one wheeled vehicle traveling across an ordinary paved or unpaved navigable surface;
   ii. one or more persons or animals walking over a surface making noise;
   iii. an insect, bat, aircraft, missile or other object making relatively constant noise, chirps or sound as it flies through the air;
   said computing subsystem running at least one algorithm performing at least the steps of:

1. digitally sampling the output signal from one of the plurality of sensors and digitally sampling the output signal from another of the plurality of sensors;
2. applying a variable digital time delay to at least the earlier arriving of the two samples;
3. applying a variable gain or amplification adjustment to at least one of the two samples;
4. adjusting the at least one time delay, and adjusting the at least one gain adjustment until a peak cross-correlation value is obtained between the two samples;
5. recording the corresponding time-difference value, which sensor signal was delayed, the sample rates and the gain values corresponding to peak cross correlation;
6. performing the above steps 1 through 5 on samples of all combinations of signals until cross-correlation values are obtained for all unique pairs of transducers, which is $_nC_2$ unique pairs, where n is the number of transducers employed or operational;
7. solving the unique solution for the position of the at least one vehicle by means of at least the multiple simultaneous hyperbolic equations involving multiple time-difference-of-arrivals (delays), the speed of sound in air, the positions of the sensors, a stored, digital three-dimensional representation of the navigable road surface or departures from a flat plane, if any;
8. using a running calculation of the time-difference-of-arrival values corresponding to peak cross correlations between at least two non-collocated pairs of transducers to obtain at least an ongoing position fix.

3. The system of claim 2 wherein the at least one algorithm performs the added steps of altering the sample rate of the signals or performing equivalent frequency up- or down-shifting steps to compensate for either or both of speed-related Doppler shift and local wind speed and direction.

4. The system of claim 2 including the capability of generating an alarm consisting of any of visible alarms, audible alarms or messages transmitted to the cloud or to specific locations or agencies whenever improper, illegal, unpermitted or undesired movement is sensed based on any of speed, direction of travel, proximity to other vehicles, persons or fixed objects, collisions, erratic operation, or violation of temporary or permanent restrictions.

* * * * *